(12) United States Patent
Goetz et al.

(10) Patent No.: US 12,473,022 B2
(45) Date of Patent: Nov. 18, 2025

(54) CONTROL UNIT AND CONTROL METHOD FOR A MOTOR VEHICLE

(71) Applicant: Bayerische Motoren Werke Aktiengesellschaft, Munich (DE)

(72) Inventors: Alexander Goetz, Munich (DE); Sebastian Rass, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 18/380,708

(22) Filed: Oct. 17, 2023

(65) Prior Publication Data

US 2024/0124056 A1 Apr. 18, 2024

(30) Foreign Application Priority Data

Oct. 18, 2022 (DE) ...................... 10 2022 127 172.2

(51) Int. Cl.
*B62D 6/00* (2006.01)
*B60W 30/12* (2020.01)
(Continued)

(52) U.S. Cl.
CPC ............. *B62D 6/002* (2013.01); *B60W 30/12* (2013.01); *B60W 30/18163* (2013.01);
(Continued)

(58) Field of Classification Search
CPC .... B62D 6/002; B62D 15/021; B62D 15/025; B60W 30/12; B60W 30/18163; B60W 50/0098; B60W 2710/20
See application file for complete search history.

(56) References Cited

U.S. PATENT DOCUMENTS

| 11,608,108 | B2* | 3/2023 | Maruyama | ........... | B62D 5/0484 |
| 12,280,823 | B2* | 4/2025 | Saigo | ................... | B62D 15/025 |

(Continued)

FOREIGN PATENT DOCUMENTS

| DE | 10 2008 051 700 A1 | 4/2010 |
| DE | 10 2014 215 243 A1 | 2/2016 |

OTHER PUBLICATIONS

German Search Report issued in German Application No. 10 2022 127 172.2 dated May 15, 2023 with partial English translation (10 pages).

*Primary Examiner* — Phutthiwat Wongwian
*Assistant Examiner* — Brian R Kirby
(74) *Attorney, Agent, or Firm* — Crowell & Moring LLP

(57) ABSTRACT

A control unit is provided for operating a driver assistance system for automated lateral guidance of a motor vehicle. The control unit is configured, in a first operating state of the driver assistance system, to determine a target position of a steering wheel of the motor vehicle on the basis of the target steering angle of the motor vehicle which is stipulated by the driver assistance system in the first operating state, and to determine a quotient from the target steering angle which is stipulated by the driver assistance system in the first operating state, and from the target position which is determined therefrom, in order to determine a conversion factor. The control unit is configured, in a second operating state of the driver assistance system which is temporally sequential to the first operating state, by the application of the conversion factor thus determined, to determine a target steering angle equivalent on the basis of the target position of the steering wheel which is stipulated by the driver assistance system in the second operating state, by the application of the conversion factor thus determined, to determine an actual steering angle equivalent on the basis of an actual position of the steering wheel which is determined in the second operating (Continued)

state, and to control an operation of the driver assistance system on the base of a target value/actual value comparison of the target steering angle equivalent and the actual steering angle equivalent.

14 Claims, 1 Drawing Sheet

(51) Int. Cl.
    *B60W 30/18* (2012.01)
    *B60W 50/00* (2006.01)
    *B62D 15/02* (2006.01)

(52) U.S. Cl.
    CPC ....... *B60W 50/0098* (2013.01); *B62D 15/021* (2013.01); *B62D 15/025* (2013.01)

(56) References Cited

U.S. PATENT DOCUMENTS

| | | | |
|---|---|---|---|
| 2011/0040446 A1* | 2/2011 | Taguchi | B62D 15/025 701/41 |
| 2012/0197496 A1* | 8/2012 | Limpibunterng | B62D 1/286 701/42 |
| 2012/0215406 A1* | 8/2012 | Tanimoto | B62D 15/025 701/41 |
| 2013/0096778 A1* | 4/2013 | Goto | B62D 5/008 701/41 |
| 2016/0046323 A1* | 2/2016 | Klank | B62D 15/027 701/41 |
| 2018/0084710 A1* | 3/2018 | Lawson | B62D 15/025 |
| 2019/0286134 A1* | 9/2019 | Niesen | B60W 50/023 |
| 2021/0042451 A1* | 2/2021 | Rhode | G06F 30/20 |
| 2023/0058697 A1* | 2/2023 | Park | B62D 15/0245 |

* cited by examiner

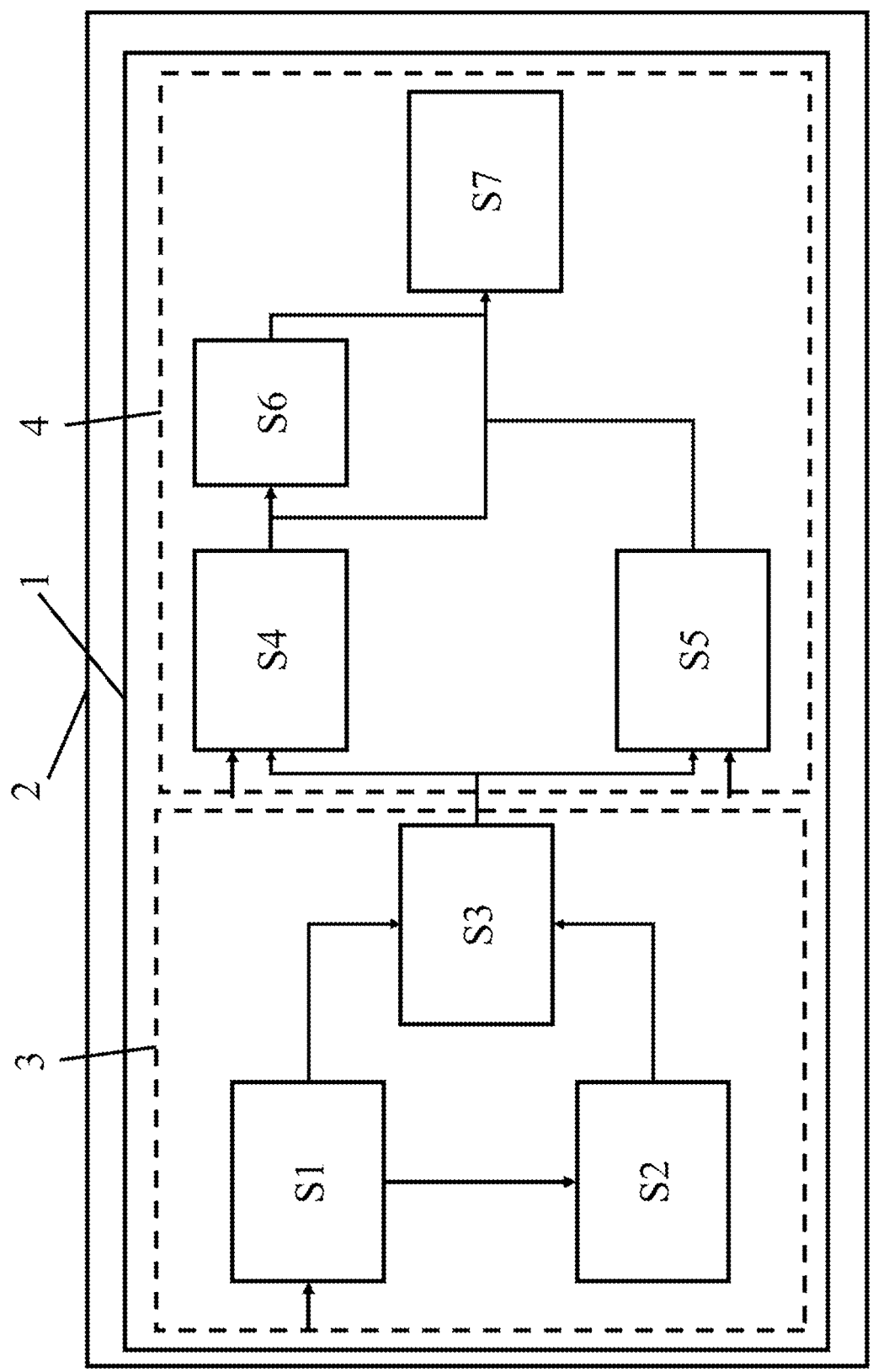

CONTROL UNIT AND CONTROL METHOD FOR A MOTOR VEHICLE

CROSS REFERENCE TO RELATED APPLICATION

This application claims priority under 35 U.S.C. § 119 from German Patent Application No. 102022127172.2, filed Oct. 18, 2022, the entire disclosure of which is herein expressly incorporated by reference.

BACKGROUND AND SUMMARY

The present disclosure relates to a control device or control unit for a motor vehicle, to a motor vehicle having a control unit, and/or to a control method for operating a driver assistance system for the automated lateral guidance of a motor vehicle. Additionally or alternatively, a computer program is provided, comprising commands which, upon the execution of the program by a computer, initiate the at least partial execution by the latter of the control method. Additionally or alternatively, a computer-readable medium is provided, comprising commands which, upon the execution thereof by a computer, initiate the at least partial execution by the latter of the control method.

In state-of-the-art motor vehicles, particularly motor cars, driver assistance systems are installed to an increasing extent.

(Advanced) Driver Assistance Systems, (or (A)DAS) are electronic, in particular mechatronic devices in motor vehicles for the support of the driver in specific driving situations. These systems are frequently focused on safety aspects, but also upon the enhancement of driving convenience.

Driver assistance systems exist which are configured for the automated lateral guidance of a motor vehicle.

In this connection, for example, DE 10 2008 051 700 A1 describes a driver assistance system which is configured in the form of a lane change assistance system and/or as a lane departure warning system.

Driver assistance systems for automated lateral guidance, for the control of a function thereof, can employ target value/actual value comparisons between a target steering angle and an actual steering angle. Conventionally, such comparisons of target steering angles and actual steering angles (or, alternatively, of curvature and the steering wheel position, or similar) are executed on the basis of predefined physical variables such as, for example, the steering rack position, the pinion angle, curvature, or similar. A general conversion process, whereby an equivalent steering angle is automatically calculated from variables and signals which are available in the vehicle, and which is comparable for different vehicle types within the same range of values, is not known.

One disadvantage of the prior art is the dependence upon vehicle-specific variables, where target and actual steering angles are considered in relation to one another and compared with predefined thresholds. Conventionally, for example, an algorithm which has been conceived to function in a vehicle in which the pinion angle is employed as a manipulated variable will thus need to be entirely reset in a vehicle which considers the target rack position. For example, for the comparison of target values and actual values for the steering angle, it is necessary to define new values which are employed, for example, as comparative thresholds. These comparative thresholds can be employed to calculate a relative deviation between the target steering angle and the actual steering angle, which are evaluated, for example, in a driver assistance system and, in the event of an overshoot of a threshold, can be employed for the switch-off of active steering.

In the context of this prior art, one object of the present disclosure is the presentation of a device and/or of a method which are respectively appropriate for the enrichment of the prior art.

A specific configuration of this disclosure can permit the fulfilment of an object for the provision of a method and/or of a device which respectively permit the mutual comparison of steering angles which are targeted by a driver of a motor vehicle and by a driver assistance system of the motor vehicle, without the necessity for explicit settings to take account of vehicle-specific differences (such as, for example, the type of steering system, units employed, rear axle steering, etc.) or for the employment of specially adapted algorithms for this purpose.

This object is fulfilled by the features of the independent claim. The dependent claims contain optional further developments of the invention.

Accordingly, this object is fulfilled by a control unit for operating a driver assistance system for automated lateral guidance of a motor vehicle.

The control unit is configured, in a first operating state of the driver assistance system, to determine a target position of a steering wheel of the motor vehicle on the basis of the target steering angle of the motor vehicle which is stipulated by the driver assistance system in the first operating state.

The control unit is configured, in the first operating state of the driver assistance system, to determine a quotient from the target steering angle which is stipulated by the driver assistance system in the first operating state, and from the target position which is determined therefrom, in order to determine a conversion factor.

The control unit is configured, in a second operating state of the driver assistance system which is temporally sequential to the first operating state, by the application of the conversion factor thus determined, to determine a target steering angle equivalent on the basis of the target position of the steering wheel which is stipulated by the driver assistance system in the second operating state.

The control unit is configured, in the second operating state of the driver assistance system, by the application of the conversion factor thus determined, to determine an actual steering angle equivalent on the basis of an actual position of the steering wheel which is determined in the second operating state.

The control unit is configured, in a second operating state of the driver assistance system, to control an operation of the driver assistance system on the basis of a target value/actual value comparison of the target steering angle equivalent and the actual steering angle equivalent.

The control unit can be an element of the driver assistance system, or can form the latter. The control unit can be, for example, an electronic control unit (ECU). The electronic control unit can be an intelligent processor-controlled unit which can communicate, e.g. via a central gateway (CGW), with other modules, and which, optionally by means of field buses such as a CAN bus, LIN bus, MOST bus, FlexRay and/or via an automotive-ethernet, e.g. in combination with telematic control devices and/or an environmental sensor system, can form the on-board vehicle network.

It is contemplated that the control device controls functions which are relevant to the driving performance of the vehicle, such as steering, engine control, power transmission, the braking system and/or the tire pressure regulation system. Moreover, driver assistance systems such as, for example, a park assist function, an appropriate speed control function (ACC, or adaptive cruise control), a lane keeping system, a lane departure warning system, a traffic sign detection function, a light signal detection function, a start-up assistance function, a night vision assistance function and/or an intersection assistance function can be controlled by the control device.

The term "steering angle", as employed herein, is thus to be understood as the angle described by a direction of travel of the motor vehicle in a longitudinal vehicle orientation, or by a curvature in a planned trajectory of the motor vehicle. In other words, the longitudinal vehicle orientation, which is generally designated as X in the motor vehicle, is oriented in parallel with a primary direction of travel of the motor vehicle, i.e. a direction of travel of the motor vehicle which is engaged if no action is applied to the wheels of the motor vehicle. In this straight travel, the steering angle is 0°. Any steering angle which deviates herefrom will result in a movement of the motor vehicle to the left or the right. This can be achieved by the turning of, or the application of an action to the wheels which are responsible for the steering of the motor vehicle. However, the concept of the steering angle is distinguished from the position of the steering wheel of the motor vehicle, which indicates the position which must be adopted by the steering wheel in order to engage a specific steering angle.

By the employment of the terms "target" and "actual" herein, a target value signifies a desired or pursued value. Conversely, an actual value is the effective value which exists in practice.

The above-mentioned control unit provides a series of advantages. Among others, the above-mentioned control unit excludes any (further) dependence upon vehicle-specific variables, where target and actual steering angles are considered in relation to one another and compared with predefined thresholds. Thus, for example, it is not necessary to adapt an algorithm, which is employed for the execution of the above-mentioned steps, to the respective vehicle in which the control unit is installed.

Potential further developments of the above-mentioned control unit are described in detail hereinafter.

The control unit can be configured, in the first operating state, to determine a plurality of target positions of the steering wheel of the vehicle on the basis of a plurality of target steering angles which are stipulated by the driver assistance system in the first operating state. The control unit can further be configured, in the first operating state, to generate a respective quotient from the target steering angles stipulated by the driver assistance system and the target positions which are respectively determined therefrom, in order to establish a conversion factor as a mean value of the quotients thus determined.

The first operating state of the driver assistance system can be triggered by a restart of the control unit, which is optionally conditional upon a restart of the motor vehicle.

It is contemplated that the conversion factor is only determined in the first operating state, if a speed of the motor vehicle is lower than a first predefined limiting value, if a difference between an actual position of the steering wheel of the motor vehicle and a target position of the steering wheel of the motor vehicle is smaller than a second predefined limiting value, and/or if the value for a target position of the steering wheel of the motor vehicle is lower than a third predefined limiting value.

The first operating state can be sustained until such time as a predefined number of quotients for the conversion factor have been determined, optionally within a predefined time interval.

Control of the operation of the driver assistance system on the basis of a target value/actual value comparison of the target steering angle equivalent and the actual steering angle equivalent can comprise a difference formation between the target steering angle equivalent and the actual steering angle equivalent, in order to determine a relative deviation, and a termination or suppression of the activation of automated lateral control of the motor vehicle by the driver assistance system, if the relative deviation exceeds a fourth predefined limiting value.

In other words, the above-mentioned arrangement, and a more specific potential configuration of the disclosure, can be summarized as described in detail hereinafter, wherein the following description is not provided by way of limitation of the disclosure.

An algorithm can be provided, which is capable of being employed in (motor) vehicles having arbitrary configurations of a steering system and of generating a uniform dimension for all vehicle types from a steering angle which is in force in the vehicle, without the necessity for the knowledge of all properties and specific features of the respective vehicle. To this end, the algorithm can require only the target steering angle (or curvature) and the target position of the steering system, calculated e.g. by an electronic stability controller. From the above-mentioned variables, a quotient can initially be formed in the following manner which, in the linear range, expresses a near-accurate relationship between the steering angle (or curvature) and the steering wheel position: quotient=target steering angle/target position of the steering wheel.

A teach-in of the quotient can be executed further to a restart (optionally further to each restart) of the vehicle or the control device, wherein a measurement series of quotients is calculated within a predefined time interval, and the mean is formed from the calculated quotients. Optionally, this learning process is only executed, or quotients are only calculated if conditions for speed (v<threshold a), the difference in the steering angle ((actual position of the steering wheel—target position of the steering wheel)<threshold b) and/or the absolute steering angle (target position of the steering wheel<threshold c) are fulfilled. Immediately one of the above-mentioned conditions is no longer fulfilled, the learning process can be reset and the measurement series completed thus far discarded. Immediately the fulfilment of all conditions is restored, the learning process can be restarted. If the learning process is complete (e.g. 10 measuring points have been captured within 20 seconds and the average of quotients formed), the calculated final quotient can be saved and employed thereafter in the process for the conversion of steering wheel positions into abstracted variables.

One option for the final calculation of comparable and generalized steering angle equivalents can be executed by means of the calculation described in the following example.

As an example, a program can be adopted, the object of which is the mutual comparison of the target steering angle and an actual steering angle in a vehicle having a steering driver assistance system, in order to permit the establishment of conclusions with respect to the action of the driver. The program can thus function in a wide variety of vehicles having different steering systems and different hardware, without the necessity for the execution of manual adaptations of the program.

In order to fulfil this object, firstly, the above-mentioned quotient can be calculated or determined. Thereafter, the conversion to steering angle equivalents can be executed as follows:

> Steering angle equivalent of actual position=Actual position of steering wheel*Quotient of steering angle equivalent of target position=Target position of steering wheel*Quotient A relative comparison of actual and target values can now be executed on the basis of equivalents, e.g.: Relative deviation=(Steering angle equivalent of target position−Steering angle equivalent of actual position)/stipulated threshold value.

In the scenario described, the stipulated threshold value can be defined e.g. on a one-off basis, and left unchanged for all the variants in which the program is to be employed, wherein the algorithm will consistently deliver plausible and meaningful results.

Were no equivalent to the steering angle, or any otherwise unprocessed variables in the respective vehicle to be employed, an adjustment of the predefined threshold value would be required for each vehicle variant, in order to achieve comparable results.

By means of the preferred approach, all properties of a vehicle can be considered in the context of the calculation of the above-mentioned quotients. Potential properties include, among others: a unit for the steering wheel position, an influence of rear axle steering, an influence of hardware variations, an influence of scattering effects in hardware of identical design and/or an influence of measuring inaccuracies.

A motor vehicle having the above-mentioned control unit is further provided.

The motor vehicle can be a passenger vehicle, in particular a car, a motorized two- or three-wheeled vehicle, or a utility vehicle, such as a heavy goods vehicle.

The motor vehicle can be automated. The motor vehicle can be configured to assume, by means of the driver assistance system, longitudinal and/or lateral guidance during automated driving of the motor vehicle, at least partially and/or at least intermittently.

Automated driving can be executed such that the movement of the motor vehicle proceeds in a (substantially) autonomous manner. Automated driving can be at least partially and/or intermittently controlled by the control unit.

It is contemplated for the motor vehicle, by means of the driver assistance system, to intervene passively, e.g. by the indication of a recommended lane change, and/or actively, e.g. by an adjustment of an actual steering wheel position, in the lateral guidance of the motor vehicle.

The content of the preceding description of the control device also applies in an analogous manner to the motor vehicle, and vice versa.

A control method is further provided for operating a driver assistance system for the automated lateral guidance of a motor vehicle.

The control method comprises, in a first operating state of the driver assistance system, a determination of a target position of a steering wheel of a motor vehicle on the basis of a target steering angle of the motor vehicle stipulated by the driver assistance system in the first operating state, and a determination of a quotient from the target steering angle stipulated by the driver assistance system in the first operating state and the target position thus determined, in order to define a conversion factor.

The control method, in a second operating state of the driver assistance system which is temporally sequential to the first operating state, comprises a determination of a target steering angle equivalent using the conversion factor thus defined, on the basis of a target position of the steering wheel stipulated by the driver assistance system in a second operating state, a determination of an actual steering angle equivalent using the conversion factor thus defined, on the basis of an actual position of the steering wheel determined in the second operating state, and an operational control of the driver assistance system on the basis of a target value/actual value comparison of the target steering angle equivalent and the actual steering angle equivalent.

The control method can be a computer-implemented method, i.e. one, a number, or all the steps of the method can be at least partially executed by a computer or a data processing device, optionally by the control device.

The content of the preceding description of the control unit and the motor vehicle also applies in an analogous manner to the control method, and vice versa.

A computer program is further provided, comprising commands which, upon the execution of the program by a computer, initiate the at least partial implementation or execution by the latter of the above-mentioned method.

Program code of the computer program can be provided in the form of an arbitrary code, particularly a code which is appropriate for the control of motor vehicles.

The content of the preceding description of the control unit, the motor vehicle and the control method also apply in an analogous manner to the computer program, and vice versa.

A computer-readable medium is further provided, in particular a computer-readable storage medium. The computer-readable medium comprises commands which, upon the execution of said commands by a computer, initiate the at least partial execution by the latter of the above-mentioned method.

This means that a computer-readable medium can be provided, which comprises an above-mentioned computer program. The computer-readable medium can be an arbitrary digital data storage device such as, for example, a USB stick, a hard disk, s CD-ROM, a SD card or a SSD card.

It is not absolutely necessary for a computer program to be saved on a computer-readable storage medium of this type, in order to permit the availability thereof to the motor vehicle, wherein the program can also be accessed via the Internet, or can be otherwise externally sourced.

The content of the preceding description of the control method, the control unit, the computer program and the motor vehicle also applies in an analogous manner to the computer-readable medium, and vice versa.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic representation of a control unit for operating a driver assistance system or a driver assistance function for the automated lateral guidance of a motor vehicle, together with a flow diagram of a control method which is executed for this purpose by the control unit.

DETAILED DESCRIPTION OF THE DRAWING

The control unit 1 of a motor vehicle 2, which is represented in a schematic manner only in FIG. 1, is configured as a driver assistance system for controlling a lateral guidance of the motor vehicle 2. In the context thereof, the control unit 1 is configured to execute the control method which is described in detail hereinafter, by means of an algorithm, the flow diagram of which is also represented in FIG. 1. The algorithm is executed immediately upon the start-up or booting of the control unit 1. The method can be broadly subdivided into two sequential blocks 3, 4, wherein the first of these blocks 3 in time can also be described as a first operating state of the driver assistance system, and the second block 4, which temporally follows the first, can also be described as a second operating state of the driver assistance system.

In a first step S1 of the method, which is executed during the first or initial block 3, the algorithm receives or determines a target steering angle of the motor vehicle 2.

In a second step S2 of the method, which is executed during the first block 3, the algorithm, on the basis of the target steering angle received in step S1, determines a target position of an (unrepresented) steering wheel of the motor vehicle 2.

In a third step S3 of the method, which is executed during the first block 3, the algorithm, from the target steering angle received in the first step S1 and the target position of the steering wheel determined therefrom, determines a quotient. This quotient can also be described as a conversion factor.

The first to third steps S1-S3 of the method are executed repeatedly within a predefined time period, until such time as a predefined number of conversion factors have been generated, from which a mean value is then formed, in order to obtain a final conversion factor which is employed in the second block 4 of the method. Determination of the conversion factor in the first three steps S1-S3 of the method is only executed if a speed of the motor vehicle 2 is lower than a first predefined limiting value, if a difference between an actual position of the steering wheel of the motor vehicle 2 and a target position of the steering wheel of the motor vehicle is smaller than a second predefined limiting value, and if a target position of the steering wheel of the motor vehicle 2 lies below a third predefined limiting value. If any one of these three conditions is not fulfilled, any conversion factors determined thus far will be discarded, and the method will recommence from the first step S1. However, immediately after the final conversion factor has been generated within the stipulated time period, the method will proceed to block 4, which is described in detail hereinafter.

In a fourth step S4 of the method, which is executed during the second block 4, the algorithm determines a target steering angle equivalent as the product of the final conversion factor and the current target steering angle of the driver assistance system.

In a fifth step S5 of the method, which is executed during the second block 4, the algorithm determines an actual steering angle equivalent as the product of the final conversion factor and the current actual steering angle of the motor vehicle 2.

In a sixth step S6 of the method, which is executed during the second block 4, the algorithm determines an upper and a lower limiting value by the addition or subtraction of a predefined value to/from the target steering angle equivalent determined in the fifth step S5.

In a seventh step S7 of the method, which is executed during the second block 4, the algorithm executes a target value/actual value comparison of the target steering angle equivalent and the actual steering angle equivalent, in order to detect any under-steering or over-steering. This is achieved by means of a difference formation between the target steering angle equivalent and the actual steering angle equivalent, in order to determine a relative deviation. This relative deviation is then compared with the lower and the upper limiting values, which have been respectively determined in the sixth step S6. If the relative deviation lies between the upper and lower limiting values, no under-steering or over-steering is in force. Otherwise, if the relative deviation lies outside the tolerance range which is defined by the upper and lower limiting values, an under-steering or over-steering is in force. This results in the output of a control signal, which terminates, or suppresses the activation of an automated lateral guidance which is executed by the driver assistance system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Control unit
2 Motor vehicle
3 First operating state of the driver assistance system
4 Second operating state of the driver assistance system
S1-S7 Process steps

What is claimed is:

1. An apparatus for operating a driver assistance system for automated lateral guidance of a motor vehicle, comprising:
a control unit, wherein
(i) in a first operating state of the driver assistance system, the control unit is configured to:
determine a target position of a steering wheel of the motor vehicle based on a target steering angle of the motor vehicle which is stipulated by the driver assistance system in the first operating state, and
determine a quotient from the target steering angle which is stipulated by the driver assistance system in the first operating state, and from the target position which is determined therefrom, in order to determine a conversion factor; and
(ii) in a second operating state of the driver assistance system which is temporally sequential to the first operating state, the control unit is configured to:
by applying the conversion factor thus determined, determine a target steering angle equivalent based on the target position of the steering wheel which is stipulated by the driver assistance system in the second operating state,
by applying the conversion factor thus determined, determine an actual steering angle equivalent based on the actual position of the steering wheel which is determined in the second operating state, and
control an operation of the driver assistance system based on a target value/actual value comparison of the target steering angle equivalent and the actual steering angle equivalent.

2. The apparatus as claimed in claim 1, wherein, in the first operating state, the control unit is further configured to:
determine a plurality of target positions of the steering wheel of the motor vehicle based on a plurality of target steering angles of the motor vehicle which are stipulated by the driver assistance system in the first operating state, and in the first operating state, generate a respective quotient from the target steering angles stipulated by the driver assistance system and the target positions which are respectively determined therefrom, in order to establish a conversion factor as a mean value of the quotients thus determined.

3. The apparatus as claimed in claim 1, wherein
the first operating state of the driver assistance system is triggered by a restart of the control unit.

4. The apparatus as claimed in claim 1, wherein the conversion factor is only determined in the first operating state, when:
a speed of the motor vehicle is lower than a first predefined limiting value,
a difference between an actual position of the steering wheel of the motor vehicle and a target position of the steering wheel of the motor vehicle is smaller than a second predefined limiting value, and/or
a value for a target position of the steering wheel of the motor vehicle is lower than a third predefined limiting value.

5. The apparatus as claimed in claim 1, wherein
the first operating state is sustained until such time as a predefined number of quotients for the conversion factor have been determined, optionally within a predefined time interval.

6. The apparatus as claimed in claim 1, wherein control of the operation of the driver assistance system based on a target value/actual value comparison of the target steering angle equivalent and the actual steering angle equivalent comprises:
a difference formation between the target steering angle equivalent and the actual steering angle equivalent, in order to determine a relative deviation, and
termination, or suppression of the activation of automated lateral control of the motor vehicle by the driver assistance system, if the relative deviation exceeds a fourth predefined limiting value.

7. A motor vehicle comprising the apparatus as claimed in claim 1.

8. A method for operating a driver assistance system for automated lateral guidance of a motor vehicle, the method comprising:
(i) in a first operating state of the driver assistance system:
determining a target position of a steering wheel of the motor vehicle based on a target steering angle of the motor vehicle stipulated by a driver assistance system in the first operating state, and
determining a quotient from the target steering angle stipulated by the driver assistance system in the first operating state and the target position thus determined, in order to define a conversion factor; and
(ii) in a second operating state of the driver assistance system which is temporally sequential to the first operating state:
determining a target steering angle equivalent using the conversion factor thus defined, based on a target position of the steering wheel stipulated by the driver assistance system in the second operating state,
determining an actual steering angle equivalent using the conversion factor thus defined, based on an actual position of the steering wheel determined in the second operating state, and
controlling operation of the driver assistance system based on a target value/actual value comparison of the target steering angle equivalent and the actual steering angle equivalent.

9. The method as claimed in claim 8, wherein, in the first operating state, the method further comprises:
determining a plurality of target positions of the steering wheel of the motor vehicle based on a plurality of target steering angles of the motor vehicle which are stipulated by the driver assistance system in the first operating state, and
in the first operating state, generating a respective quotient from the target steering angles stipulated by the driver assistance system and the target positions which are respectively determined therefrom, in order to establish a conversion factor as a mean value of the quotients thus determined.

10. The method as claimed in claim 8, wherein
the first operating state of the driver assistance system is triggered by a restart of the control unit.

11. The method as claimed in claim 8, wherein the conversion factor is only determined in the first operating state, when:
a speed of the motor vehicle is lower than a first predefined limiting value,
a difference between an actual position of the steering wheel of the motor vehicle and a target position of the steering wheel of the motor vehicle is smaller than a second predefined limiting value, and/or
a value for a target position of the steering wheel of the motor vehicle is lower than a third predefined limiting value.

12. The method as claimed in claim 8, wherein
the first operating state is sustained until such time as a predefined number of quotients for the conversion factor have been determined, optionally within a predefined time interval.

13. The method as claimed in claim 8, wherein controlling the operation of the driver assistance system based on a target value/actual value comparison of the target steering angle equivalent and the actual steering angle equivalent comprises:
a difference formation between the target steering angle equivalent and the actual steering angle equivalent, in order to determine a relative deviation, and
termination, or suppression of the activation of automated lateral control of the motor vehicle by the driver assistance system, if the relative deviation exceeds a fourth predefined limiting value.

14. A computer product comprising a non-transitory computer-readable medium having stored thereon program code which, when executed by one or more processors, carries out the acts of:
(i) in a first operating state of the driver assistance system:
determining a target position of a steering wheel of the motor vehicle based on a target steering angle of the motor vehicle stipulated by a driver assistance system in the first operating state, and
determining a quotient from the target steering angle stipulated by the driver assistance system in the first operating state and the target position thus determined, in order to define a conversion factor; and
(ii) in a second operating state of the driver assistance system which is temporally sequential to the first operating state:
determining a target steering angle equivalent using the conversion factor thus defined, based on a target position of the steering wheel stipulated by the driver assistance system in the second operating state, determining an actual steering angle equivalent using the conversion factor thus defined, based on an actual position of the steering wheel determined in the second operating state, and controlling operation of the driver assistance system based on a target value/actual value comparison of the target steering angle equivalent and the actual steering angle equivalent.

\* \* \* \* \*